(No Model.) 2 Sheets—Sheet 1.
M. E. HALL.
PATTERN OR CHART.
No. 573,408. Patented Dec. 15, 1896.
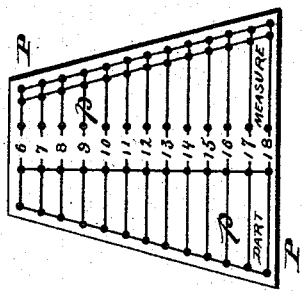
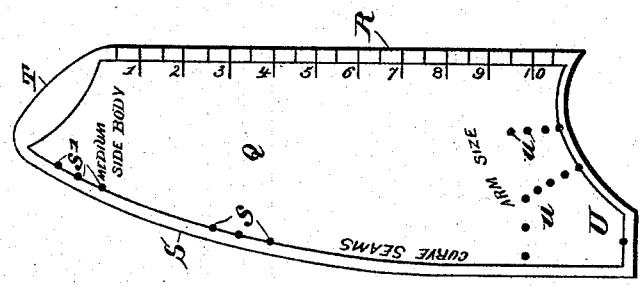
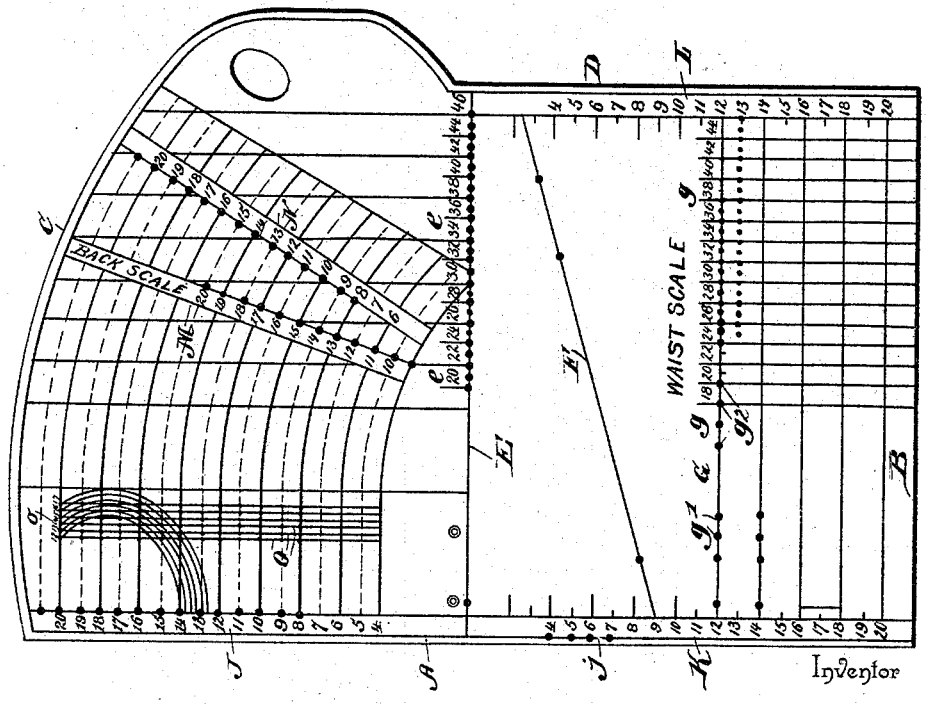
Witnesses
H. F. Dieterich
V. B. Hillyard
Inventor
Martha E. Hall,
By her Attorneys,
C. A. Snow & Co.

(No Model.)

M. E. HALL.
PATTERN OR CHART.

No. 573,408.

2 Sheets—Sheet 2.

Patented Dec. 15, 1896.

Witnesses
H. G. Dieterich
V. B. Hillyard

Inventor
Martha E. Hall
By her Attorneys,
C. A. Snow & Co.

UNITED STATES PATENT OFFICE.

MARTHA E. HALL, OF NEWMARKET, INDIANA.

PATTERN OR CHART.

SPECIFICATION forming part of Letters Patent No. 573,408, dated December 15, 1896.

Application filed August 6, 1896. Serial No. 601,911. (No model.)

*To all whom it may concern:*

Be it known that I, MARTHA E. HALL, a citizen of the United States, residing at Newmarket, in the county of Montgomery and State of Indiana, have invented a new and useful Pattern or Chart, of which the following is a specification.

This invention relates to means for facilitating the cutting of ladies' and misses' waists after certain measurements, such as the length of waist, bust, neck, arm, &c., have been obtained.

The improvement consists of a chart having lines and scales imprinted thereon and relatively located, as more fully set forth in the subjoined claims, so as to determine with certainty the position of the dots, which when united give the outline of the parts forming the garment. The lines and scales may be perforated, so that the chart can be placed over the goods and the dots located by marking through the openings, or if the lining or material is sufficiently thin or open to admit of the scales being observed therethrough it can be placed upon the chart and the points determining the outline located.

A delineator and dart-measure are used with and form a part of the chart, measure, or pattern, and enable the correct outlining of the several pieces, so as to secure a neat-fitting garment.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 6:
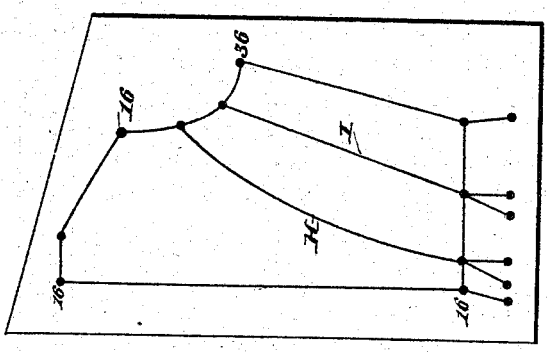
Figure 4:
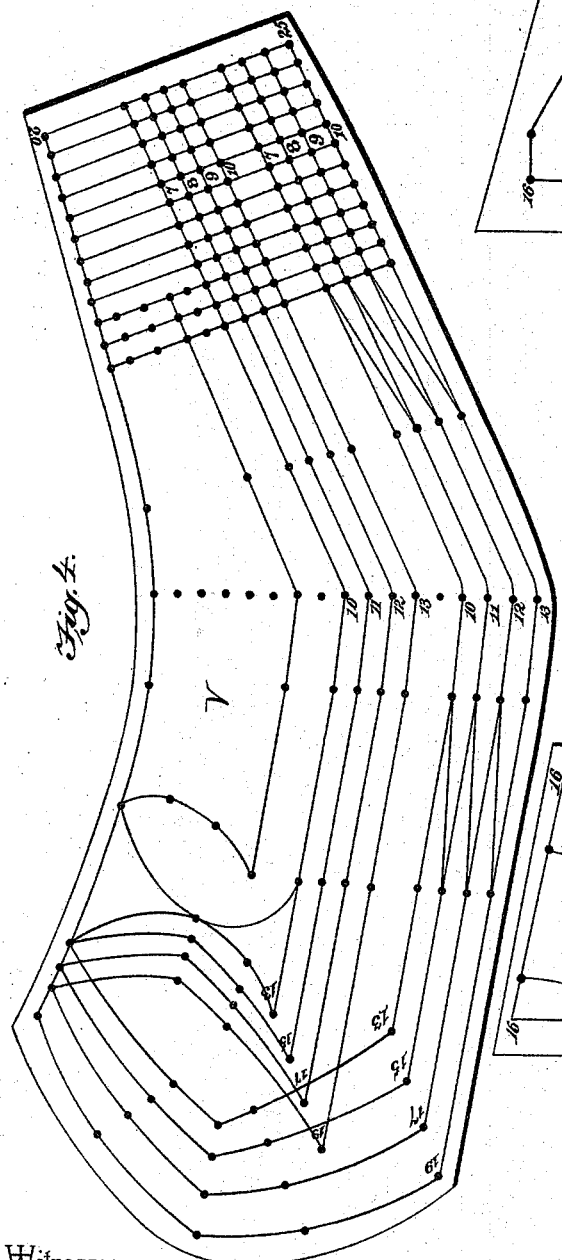
Figure 5:
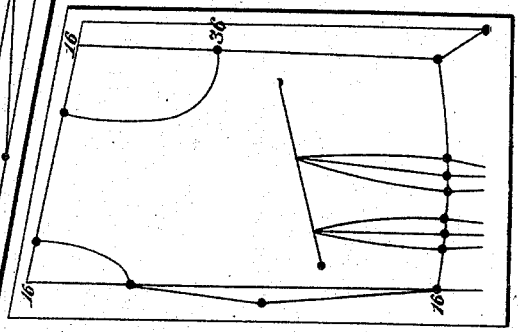

Figure 1 is a face view of the chart. Fig. 2 is a face view of the delineator. Fig. 3 is a face view of the dart-measure. Fig. 4 is a face view of the sleeve-pattern. Fig. 5 is a detail view of a front piece outlined by means of the improved chart. Fig. 6 is a detail view of a back piece outlined by means of the chart.

The chart, including the delineator, dart-measure, and sleeve-pattern, is composed of card or press board or other suitable sheet material, and has various scales imprinted thereon to assist in correctly locating the points which determine the outline of the piece or pattern to be cut. The chart has one edge, as A, straight, an adjacent edge, as B, likewise straight, a curved edge C opposite to the edge B, and an edge D straight for a portion of its length from the edge B and curving outward for the remainder of its length and joining the edge C. A line E joins the edges A and D and is located about midway of the edges B and C and corresponds approximately with the position of the bust and is provided with a scale $e$ to determine the bust-measure. A line F extends obliquely across the chart from the edge A to the edge D and fixes the height of the darts.

A straight line G extends parallel with the edge B and is located below the oblique line F and corresponds to the waist-line and is provided with a scale $g$ to indicate the waist-measure. A series of three dots or openings $g'$ are provided on the waist-line G a short distance from the edge A and determine the lower end of the curved seam H, adjacent to the middle or back seam, the dot nearest the edge A being selected for small persons, the middle dot for medium-sized persons, and the last dot for persons of large build.

A group of dots or openings $g^2$ is disposed along the waist-line G intermediate of the scale $g$ and the dots $g'$ and fixes the lower end of the straight seam I adjacent to the under-arm seam, the proper dot or opening being selected according to the build of the person to be fitted. A scale J is provided at the edge A above the bust-line E, and a corresponding scale K is located at the edge A below the bust-line E, and these scales J and K determine the length of the front and back seams. A series of dots or openings $j$ are located along the edge A directly opposite the beginning of the scale K and are intended to regulate the fullness of the bust, the proper opening or dot being selected to suit the figure of the person to be fitted. A scale L, corresponding to the scale K and similarly graduated, is placed along the straight portion of the edge D and enables the dots to be properly located at both edges of the pattern. An oblique scale M extends inward from the edge C and fixes the slope of the back, and a similar scale N, located to the right or between the scale M and the edge D, determines the slope of the shoulder for the front piece, the scales M and N being similarly graduated and the graduations being differently located to secure the proper slope for the shoulder-seams of the front and back pieces. A series of parallel lines O extend parallel with the scale J and intersect with the lines projected from the graduations of the scale J and determine the neck-measure, the said lines forming, in effect, a neck measure or scale which is graduated at the top, as shown at $o$.

The dots determining the outline of the front and back pieces of a waist or garment are located by reference to the various scales upon the chart, the latter being placed over the goods and the dots marked through the openings of the scales, or if the lining or material is sufficiently thin or open, so as to admit of the scales being read therethrough, the material can be placed upon the chart. The front and back seams are determined by the scales J and K, the shoulder-seams and slope of shoulder by the scales M and N, the bust-measure by the scale $e$, and the waist-measure by the scale $g$. The size of the neck is indicated by the scale $o$, the dot being located at the intersection of the vertical line corresponding with the neck-measure and the line projected from the graduation of the scale J corresponding with the length of the front and back seams.

The dart-measure P is of trapezoidal form and has a series of scales $p$ at its edges and intermediate of the edges for determining the width of the darts on the waist-line G. The height of the darts is determined by the line F and the width by selecting the proper scale on the dart-measure, the dart-measure being properly positioned with respect to the waist-line G by taking the difference between the measure of the bust and the waist, and the graduation of the scale $p$ corresponding with the difference is placed opposite and in coincident relation with the waist-line G and the dots marked corresponding to the marks or openings designated by the scale-graduation.

The delineator Q tapers toward one end and has a straight edge R, a curved edge S, a curved end T, and a straight and curved edge U. The curved edge S has a group of marks or openings $s$ about midway of its length and a corresponding group $s'$ adjacent to the curved end T, said marks or openings determining the position of the delineator when laying off the curved lines for the darts and the seam H. A series of openings $u$ extend inward from the curved portion of the edge U and determine the dots or marks corresponding to the upper end of the seams H and I. The curved portion of the edge U, as also the curved end T, are used in laying off the curved lines corresponding with the neck and armhole.

The sleeve-pattern V has the ordinary outline, its top edge curving inwardly, its bottom edge curving outwardly, and one end being straight and the other end curved, and is provided with a series of dots or openings, substantially as shown, corresponding to different-sized sleeves, the dots or openings corresponding to a given size being similarly numbered, so as to facilitate the outlining of the upper and lower parts of a sleeve of desired size.

Having thus described the invention, what is claimed as new is—

1. A chart for outlining garments having a bust line and scale extending transversely thereof at a point intermediate of its ends, a waist line and scale parallel with and at a distance from the said bust line and scale, the scales of the waist and bust lines corresponding, an oblique line intermediate of the bust and waist lines and extending from one to the other edge of the chart, similar scales at one edge on opposite sides of the bust-line, and having a scale at the other edge below the bust-line and corresponding with the scale at the opposite edge, substantially as and for the purpose set forth.

2. A chart for outlining garments, having a bust line and scale intermediate of its ends, and having scales at one edge on each side of the bust-line, and having a neck-scale comprising a series of parallel lines intersecting with lines projecting from the graduations of the upper edge scale, and having oblique scales M and N for determining the slope of the shoulder in conjunction with the said upper edge scale, and provided with a waist line and scale, and having an oblique line to determine the height of the darts, substantially as set forth.

3. The combination with a chart having a series of scales substantially as shown for determining the position of the dots corresponding to the outline of the piece or pieces to be cut, of a delineator having a straight edge, a curved edge, a curved end, and an edge having a straight and curved portion, the curved portion having inwardly-extending dots or openings and the curved edge S having two sets or groups of marks or openings $s$ and $s'$ for determining the proper position of the curved edge when marking the curved seams and dart-lines upon the pattern, substantially as set forth.

4. The combination with a chart having a series of scales substantially as shown and provided with a graduated waist-line and an oblique dart-line, of a dart-measure of trapezoidal form and having a series of scales substantially as illustrated and adapted to indicate the position and width of the darts upon the waist-line of the chart, substantially as set forth.

In testimony that I claim the foregoing as my own I have hereto affixed my signature in the presence of two witnesses.

MARTHA E. HALL.

Witnesses:
STEPHEN A. STILWELL,
A. H. HERNLEY.